US009332520B2

(12) United States Patent
Nadler et al.

(10) Patent No.: US 9,332,520 B2
(45) Date of Patent: *May 3, 2016

(54) METHOD AND SYSTEM FOR TRACKING AND DETERMINING A LOCATION OF A WIRELESS TRANSMISSION

(75) Inventors: Barry Nadler, Largo, FL (US); Joseph S. Noonan, Scituate, MA (US); Maosen Fang, Quincy, MA (US)

(73) Assignee: BINJ Laboratories, Inc., Scituate, MA (US)

( * ) Notice: Subject to any disclaimer, the term of this patent is extended or adjusted under 35 U.S.C. 154(b) by 508 days.

This patent is subject to a terminal disclaimer.

(21) Appl. No.: 13/567,086

(22) Filed: Aug. 5, 2012

(65) Prior Publication Data

US 2013/0012227 A1 Jan. 10, 2013

Related U.S. Application Data

(63) Continuation of application No. 12/157,530, filed on Jun. 11, 2008, now Pat. No. 8,238,936, which is a continuation-in-part of application No. 11/457,786, filed on Jul. 14, 2006, now Pat. No. 8,078,190.

(60) Provisional application No. 60/739,877, filed on Nov. 23, 2005, provisional application No. 60/699,281, filed on Jul. 14, 2005.

(51) Int. Cl.
*H04W 24/00* (2009.01)
*H04W 64/00* (2009.01)

(52) U.S. Cl.
CPC .................................... *H04W 64/00* (2013.01)

(58) Field of Classification Search
USPC .................... 455/456.1, 456.2, 456.3, 456.5; 375/316
See application file for complete search history.

(56) References Cited

U.S. PATENT DOCUMENTS

| 4,054,754 | A | 10/1977 | Nicodemus |
| 4,638,496 | A | 1/1987 | Jensen |
| 5,966,655 | A | 10/1999 | Hardouin |
| 6,205,189 | B1 | 3/2001 | Ha |
| 6,222,458 | B1 | 4/2001 | Harris |
| 6,343,212 | B1 | 1/2002 | Weber |
| 6,580,372 | B1 | 6/2003 | Harris |
| 6,765,492 | B2 | 7/2004 | Harris |
| 6,839,876 | B1 * | 1/2005 | Tong et al. .................... 714/783 |
| 7,202,798 | B2 | 4/2007 | Harris |
| 8,238,936 | B2 * | 8/2012 | Nadler et al. .............. 455/456.1 |
| 2002/0011119 | A1 | 1/2002 | Bignell |
| 2002/0098850 | A1 | 7/2002 | Akhteruzzaman |

(Continued)

*Primary Examiner* — Justin Lee
(74) *Attorney, Agent, or Firm* — Law Office of Carl Giordano, PC

(57) ABSTRACT

An apparatus for detecting and timing a transmitting device is disclosed. The device includes a receiving system receiving a signal containing at least a preamble code of a known length and at least one pulse within a receive window after the preamble code, a circuit receiving the at least one pulse comprising a zero-crossing circuit for indicting a zero-voltage crossing of the at least one pulse and a trigger device for latching the indication of zero-voltage crossing, and a ripple circuit counter, receiving the latched indication of said zero-voltage crossing and associating a time to the receipt of the latched indication. A system for detecting and locating a transmitting device is further disclosed. The system includes a plurality of sensor apparatus each determining a reception time of a signal and a processor for determining a location based on groups of the reception times.

11 Claims, 14 Drawing Sheets

(56) References Cited

U.S. PATENT DOCUMENTS

| | | |
|---|---|---|
| 2003/0206112 A1 | 11/2003 | Harris |
| 2004/0246139 A1 | 12/2004 | Harris |
| 2004/0266390 A1* | 12/2004 | Faucher et al. ............ 455/404.1 |
| 2006/0099968 A1 | 5/2006 | Harris |
| 2006/0105758 A1 | 5/2006 | Maislos |
| 2006/0111062 A1 | 5/2006 | Cunningham |
| 2006/0160545 A1 | 7/2006 | Goren |

* cited by examiner

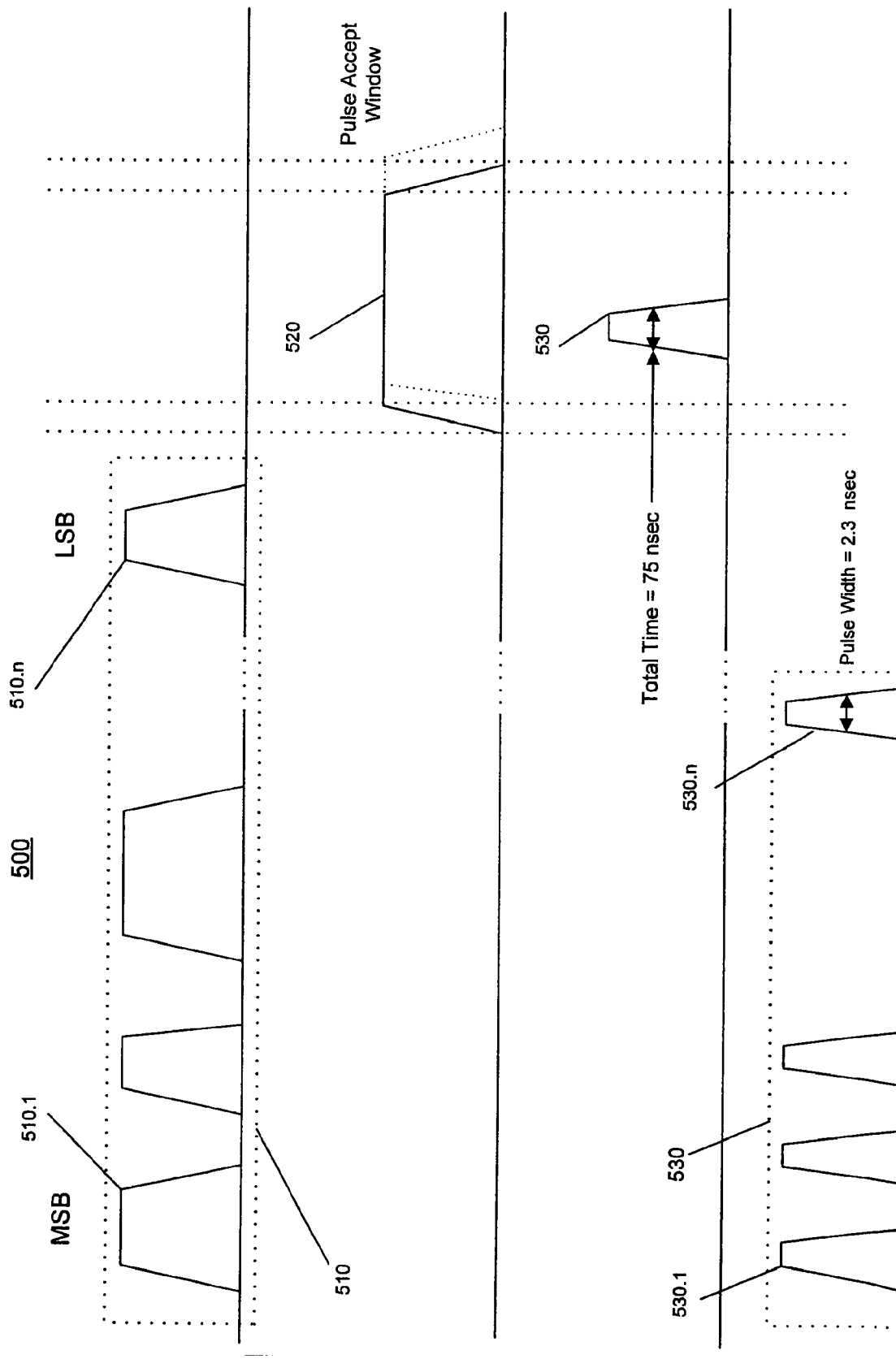

METHOD AND SYSTEM FOR TRACKING AND DETERMINING A LOCATION OF A WIRELESS TRANSMISSION

CLAIM OF PRIORITY

This application claims the benefit of the earlier filing date, pursuant to 35 USC 120, as a continuation of that patent applications entitled "Method and System for Tracking and Determining a Location of a Wireless Transmission, filed on Jun. 11, 2008 and afforded Ser. No. 12/157,530, now U.S. Pat. No. 8,238,936, which claimed the benefit of the earlier filing date, pursuant to 35 USC 120, as a continuation-in-part to that patent application entitled "System and Methods of Detection Transmission Facilities," filed on Jul. 14, 2006, and assigned Ser. No. 11/457,786, now U.S. Pat. No. 8,078,190, which claimed, pursuant to 35 USC 119, priority to US Provisional Patent application entitled "Signal Tracking and Identification Including Cell Phone Detection," filed on Nov. 23, 2005 and afforded Ser. No. 60/739,877 and US Provisional Patent application entitled "Cell Phone Detection System," filed on Jul. 14, 2005 and afforded Ser. No. 60/699,281, the contents of all of which are incorporated by reference herein.

RELATED APPLICATION

This application is related to that patent application Ser. No. 11/610,493, entitled "Methods and Systems for High Speed Broadband Digital Link," filed on Dec. 13, 2006, and to that patent application entitled "Method and System for Tracking and Determining a Location of a Wireless Transmission, filed on Sep. 8, 2008 and afforded Ser. No. 12/231,437, the contents of which are incorporated by reference herein.

FIELD OF THE INVENTION

The present invention is related to the field of wireless communication and more particularly to a method and system for tracking and determining the location of a wireless transmission.

BACKGROUND OF THE INVENTION

There are many facilities, such as government buildings, schools and in particular correctional complexes, such as prisons, that do not permit wireless transmission (which is referred to herein as cellular phone usage) on the premises or even possession of cell phones on the premises. Preventing usage of such cell phones and other transmission facilities in such facilities/areas is of critical importance. For example, in government buildings, such as courts, cell phones usage is limited to prevent disturbances within the court room. In military facilities, cell phone use is limited to prevent the distribution of classified materials through a text or photographic feature of the cell phone. Cell phone usage in schools is limited to avoid distractions that may occur during the class session. And in prisons or correction facilities, cell phone usage is limited to maintain control of the population within the facility. Hence, detecting, tracking and determining the location of such unauthorized cell phone usage is important to each of these different types of facilities.

In other aspects, the use of wireless communication (cell phone usage and or other wireless transmission devices) is important in determining a location of the communication and the location of the person or object wearing such communication device. For example, in fighting a fire within a high-rise building, fire personnel may be distributed among a number of floors and there is a need to know their location, first, to better organize their fire fighting skills and second, to provide direction for a safe exit in case of blockage to one or more of their egresses. Similarly, in a school situation, while student usage of cell phones may be prohibited, a wireless communication system may be useful to the student's parents in knowing that their child is actually in the school environment. Additionally, in a correctional environment the movement of staff, detainees, and equipment are critical to know the status and location of such staff, detainees and equipment.

Hence, there is a need for methods of detecting, identifying, tracking and locating wireless communication transmissions within facilities to limit regulate prevent, and/or monitor the ability to complete such wireless communication transmission.

SUMMARY OF THE INVENTION

An apparatus for detecting and timing a transmitting device is disclosed. The device includes a receiving system receiving a signal containing at least a preamble code of a known length and at least one pulse within a receive window after the preamble code, a circuit receiving the at least one pulse comprising a zero-crossing circuit for indicting a zero-voltage crossing of the at least one pulse and a trigger device for latching the indication of zero-voltage crossing, and a ripple circuit counter, receiving the latched indication of said zero-voltage crossing and associating a time to the receipt of the latched indication. A system for detecting and locating a transmitting device is further disclosed. The system includes a plurality of sensor apparatus each determining a reception time of a signal and a processor for determining a location based on groups of the reception times.

BRIEF DESCRIPTION OF THE DRAWINGS

For a better understanding of the invention, reference is now made to the drawings wherein:

FIGS. 5A and 5B illustrates exemplary message protocols in accordance with the principles of the invention;

DETAILED DESCRIPTION OF THE INVENTION

Figure 1:
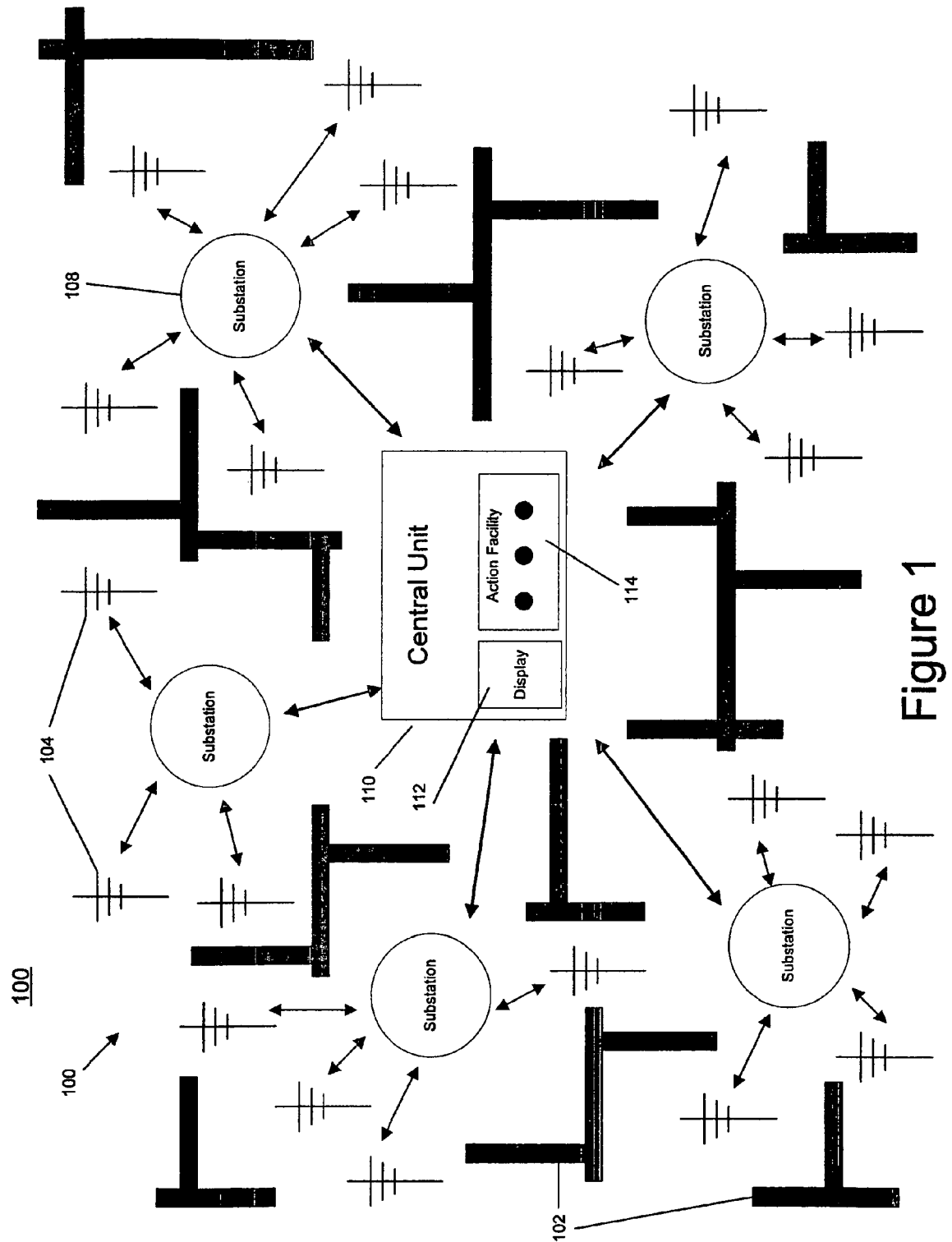
FIG. 1 illustrates a first exemplary application of a detecting, tracking, and locating system in accordance with the principle of the invention.
Figure 2:
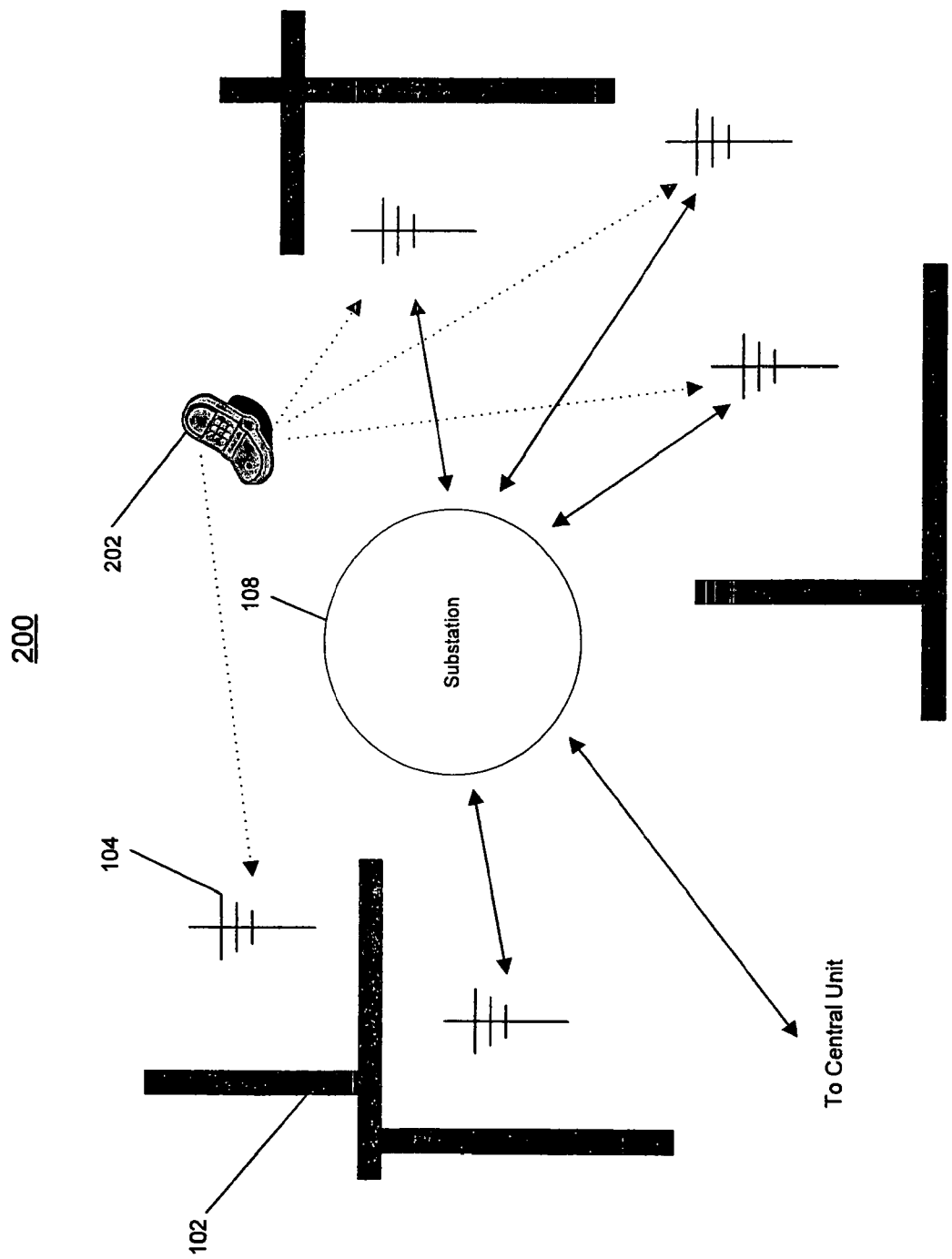
FIG. 2 illustrates one section of a detecting, tracking and locating system in accordance with the principles of the invention.

Detection of a transmission facility, such as a mobile phone or hand-held radio transmitter, radio transceiver, or other wire transmission device as described herein, within an obstruction rich environment, such as a facility with many physical barriers to electronic transmission, is difficult to achieve. Similarly the detection of a transmission outside a facility over great distances presents difficult challenges. Referring to FIG. 1, the transmission detection, identification, and reporting system 100 described herein provides a method of detecting a transmission facility 202, such as depicted in FIG. 2, within an environment rich in obstructions 102. In this illustrated example, substation (or sensing device) 108 operates as an independent detection. One embodiment of the transmission detection, identification, and reporting system 100 may involve the detection of a mobile phone 202 within a heavily walled and metal-barred government facility such as a correctional facility. In this embodiment, the system may utilize an array of antennas 104 selectively placed within the facility, collection substations 108 for localized collection of detected signals, a central unit 110 for the processing of incoming signals from the facility, a display 112 for showing the location of the detected transmission facility 202, and an action facility 114 for implementing standard procedures in the event of a detection. In this embodiment, the communications between the antennas 104 and the substations 108, and between the substations 108 and the central unit 110, may be wireless to make installation and maintenance of the system within the facility, cost and time effective. Selective placement of the antennas 104, combined with algorithms and methods for determining location of the transmission facility 202, may allow a substantially improved means for locating transmission facilities 202, such as mobile phones, in an otherwise heavily shielded environment.

In embodiments the antenna 104 may be a multi-dipole embedded antenna. Two examples of dual dipole embedded antennas are provided in FIG. 3 as a first dual-dipole embedded antenna 302 and a second dual dipole embedded antenna 304. In embodiments the antenna may be adapted to receive one, two, three, four, or more bandwidths. In embodiments the antenna 104 may be a dipole antenna 104, a Yagi-Uda Log-Periodic antenna 104, a loop antenna 104, a quad antenna 104, a micro-strip antenna 104, a helical antenna 104, a phase array antenna 104, a patch antenna or the like.

In embodiments, the transmission facility 202 may be a mobile phone, such as a flip phone, a slide phone, a cellular phone, a handset, a satellite phone, a 3G phone, a wireless phone, a cordless phone, wireless transmission or the like. In embodiments, the transmission facility 202 may be a radio, such as a walkie-talkie, a mobile radio, a short-wave radio, or the like.

In embodiments, the transmission band from the transmission may be within the radio or other electromagnetic frequency spectrum, such as extremely low frequency (ELF), super low frequency (SLF), ultra low frequency (ULF), very low frequency (VLF), low frequency (LF), medium frequency (MF), high frequency (HF), very high frequency (VHF), ultra high frequency (UHF), super high frequency (SHF), extremely high frequency (EHF), microwave, a frequency suitable for 802.11x wireless communications, ultra wide band (UWB), Bluetooth, or the like. In embodiments, the transmission may be within the radio or other electromagnetic frequency spectrum and may include multiple radio and other electromagnetic frequency spectrum transmissions, performing multi functions.

In embodiments, the obstruction 102 rich environment may be a building, such as a corrections facility, a school, a government facility, a store, a mall, a residence, a hotel, a storage complex, a motel, or the like. In embodiments, the obstruction 102 rich environment may be a large confined space, such as a courtyard, a food court, a recess area, a hallway, greenhouse, recreation room, gymnasium, auditorium, kitchen, cafeteria, craft area, work area, library, prison yard, or the like. In embodiments, the obstruction 102 may be a transmission, device transmission obstruction 102, such as cinderblock, cement, rebar, wire cage, metal, metal coated surface, or the like. In embodiments, the obstruction 102 may be other construction materials, such as wood, glass, rug, flooring materials, roofing materials, and the like. In embodiments, antenna 104 may be placed a great distances from the area where the transmission facility is located, in that case, the obstruction 102 to a transmission may be another building, rocks, trees or the like. In embodiments, the obstruction 102 may be other construction materials, such as wood, glass, rug, flooring materials, roofing materials, and the like.

In embodiments, the transmitting signal information from the antenna 104 module to the central unit 110 may be through a communications connection, such as an IEEE 802.15.4, IEEE 802.11a/b/g/n or coaxial cable, wireless network, wireless sensor to sensor (i.e., leapfrogging, hopping and repeater methodologies), IEEE 802.11 microwave, Wi-Fi, Bluetooth, Ethernet, or the and the like. In embodiments, the communications connection may utilize CAT-5, cat-6, microwave, RJ-45, RS-232, coaxial cable connections, and the like. In embodiments the communications connection may utilize an optical connection, such as a wireless infrared link, an optical fiber, and the like.

In embodiments, the transmitting signal information from the antenna 104 module to the central unit 110 may contain data, such as CDMA, CDPD, GSM, TDMA, and the like, and may be used to discriminate which service signal is being used, such as Verizon, Cingular, T-Mobile, Sprint, and the like and may transmit data sets such as text, video, data, images, and the like. The detection of the cell phones may be resolved down to cell phone manufacturer, EMEI, cell phone type, EMSI and cell phone provider and the like.

In embodiments, the transmitting signal information to the central unit 110 may be made through an intermediate connection, such as a substation 108, router, switch, hub, bridge, multiplexer, modem, network card, existing network, wireless hopping and leapfrogging meshed networks, network interface, processing unit, preprocessor, computer, repeater, antenna 104, and the like. In embodiments, the transmitting signal information to the central unit may encompass video and audio data and protocols and may include $3^{rd}$ party network traffic, TCP/IP or other protocol information and the like. In embodiments, the transmitting signal information to the central unit may be sent through internal and external network systems and the like.

In embodiments, the central unit 110 may have in part a computer, a computer system, a network of computers, a state machine, a sequencer, a microprocessor, a digital signal processor, an audio processor, a preprocessor, a microprocessor, microcontroller, and the like.

In embodiments, the central unit 110 may process information, such as data information, educational information, identification information, audio, video information, environmental (water, heat, toxins), proximity information and the like, emergency information, such as, biometric information, alert and danger information and the like, location information, such as the location of people, inmates, corrections personnel, visitors, all personnel within the facility, equipment, cell phones, wireless devices, resources, weapons, products, incoming goods, outgoing goods, movement information, such as speed, direction, height and the like. In embodiments, the information may be the identification of the transmission facility wearer. The information may be the type of signal, such as mobile phone standard protocols such as Wimax, CDMA, CDPA, GSM, TDMA, IS-95 and the like. In embodiments, the information may be an event notification, such as personnel under duress, an emergency medical condition, a call for assistance, a fire, a call for police, a theft, and the like. In embodiments, the processed information may allow for the tracking of the person or object in possession of the transmission facility 202, such as a mobile phone, a radio, a weapon, a product, a resource, and the like. In embodiments, the processed information may allow for the discrimination and/or association between people or objects, such as determining the ownership of the transmission facility 202, the assignment of the source of transmission, current location of a transmission facility 202 compared to its predicted location, and the like. In embodiments, the processed information may also have time codes and unique identifiers assigned and the like. In embodiments, the processed information may include other near area transmission facility information with unique identifiers assigned and the like.

In embodiments, the central unit 110 may have a display 112, such as a cathode ray tube (CRT), liquid crystal display 112 (LCD), electronic paper, 3D display 112, head-mounted display 112, projector, segmented display 112, computer display 112, graphic output display 112, and the like. In embodiments, the central unit 110 may have an action facility 114, comprising a user interface for causing actions relating to the detected transmission facility 202, such as closing a door, sealing a room, deploying and action signal, initiating an alarm, and the like. In embodiments, the central unit 110 may have an action facility 114, comprising an interfacing unit that interfaces with existing networks or processes which utilize the information that may be generated by one or more of the embodiments described herein.

In embodiments the functions of a central unit 110 as described herein may be replaced by an alternate configuration, such as a configuration of multiple computers, such as a group of servers, processors, or the like, operating in parallel. In embodiments the methods and systems described herein may involve locating computing capabilities in alternative network configurations, such as in a mesh network or a peer-to-peer network.

In embodiments, the location of a transmission facility 202 may be determined by various radiolocation or signal measurement techniques, including measuring phase, Magnetic field strength, amplitude, time, or a combination of these; or by identifying and locating an area associated with an antenna 104 with the highest signal strength. In embodiments, the location of a transmission facility 202 may be determined by various radiolocation or signal measurement techniques, including measuring phase, amplitude, time, or a combination of these; or by identifying and locating an area associated with other transmission facility. In embodiments, the location of a transmission facility 202 may be determined by a transceiver transmission facility 202 which includes a location sensing, such GPS, or by another transmission facility 202 containing proximity sensor, e.g., capacitive coupling, or detecting sensor, e.g., Bluetooth or other similar short range wireless detection device. In embodiments, the location of a transmission facility 202 may be determined when the transmission facility 202 is powered off though detection of a null in the band pass of a transmitted frequency sweep due to the presence of a mobile phone antenna. In embodiments, the location of a transmission facility 202 may be determined by measurement techniques, including measuring resistance, a null in the band pass, impedance, Electrometric field, near field technology radio frequency radiation methodologies, or a combination of these; or by identifying and locating an area associated with other transmission facility.

In embodiments, a method of detecting a transmission facility 202 (e.g. cell phone) when the transmission facility 202 is not powered may require a transmitting device and a receiving device that can recognize the signature of an antenna 104 associated with the transmission facility 202. By transmitting a known frequency and receiving the disturbance pattern produced by having a particular antenna 104 design in the transmission path, the pattern or 'signature' of that antenna 104 can be characterized. In embodiments, this characterization may be evaluated with a microprocessor 1402 with results output to a display 112. A database of these signatures can be placed into the device, and as the transmitter sweeps across the various cell frequencies, a pattern received can be matched against the database patterns to determine the presence of transmission facilities 202. In embodiments, any class of antenna (e.g. WI-FI, Blackberry, Walkie-Talkie, etc.) can be classified and identified.

In embodiments, the range of a hand held device that can detect an inactive transmission facility is approximately 10 feet. In embodiments, greater distances could be attained for stationary units by increasing the power and/or changing sensitivity.

Radiolocation, also referred to as radio-determination, as used herein encompasses any process of finding the location of a transmitter by means of the propagation properties of waves. The angle at which a signal is received, as well as the time it takes to propagate, may both contribute to the determination of the location of the transmission facility 202. There are a variety of methods that may be employed in the determination of the location of a transmission facility 202. Methods include (i) a cell-sector system that collects information pertaining to cell and sector ID's, (ii) the assisted-global positioning satellite (GPS) technology utilizing a GPS chipset in a mobile communication facility, (iii) standard GPS technology, (iv) enhanced-observed time difference technology utilizing software residing on a server that uses signal transmission of time differences received by geographically dispersed radio receivers to pinpoint a user's location, (v) time difference of arrival, (vi) time of arrival, (vii) angle of arrival, (viii) triangulation of cellular signals, (iix) location based on proximity to known locations (including locations of other radio-transmitters), (ix) map-based location, or any combination of any of the foregoing, as well as other location facilities known to those of skill in the art.

Obstructions 102 to radio wave propagation may greatly reduce the effectiveness of many of the conventional radiolocation methods due to obstruction of the line-of-sight between the transmission facilities 202 and the receiving antennas 104. However, by employing a large array of antennas 104, positioned so as to maintain line-of-sight between possible transmission facility 202 locations and the receiving antennas 104, several of these methods may be effectively used in the location of the transmission facility 202. Additionally, by employing an array of antennas 104, positioned to detect transmission facility 202 locations wherein the receiving antennas 104 are obstructed in such manner that line-of-sight prevented, several of these methods may be effectively used in the location of the transmission facility 202. These methods include time difference of arrival, time of arrival, and angle of arrival, amplitude comparison, and the like. The time difference of arrival method determines the difference in the time, or the difference in phase, of the same radio-transmitting signal arriving at different receiving antennas 104. Together with the known propagation speed of the radio wave, allows the determination of the location of the transmission facility 202. The time of arrival method determines the absolute time of reception of the signal at different receiving antennas 104, and again, along with the known propagation speed of the radio wave, allows the determination of the location of the transmission facility 202. The angle of arrival method utilizes direction of transmission to different antennas 104 to determine the location of the transmission facility. Amplitude comparison method compares the strength of the signal detected at each antenna to determine the location of a transmission facility 202. For example, two antennas 104 located in the same room would detect different signal amplitudes for the same transmission facility 202 output, thereby providing a means of determining which antenna 104 the transmission facility 202 is closer to. Increasing the number of antennas 104 therefore increases the resolution with which the location of the transmission facility 202 may be determined. All of these methods, and combinations of these methods, may employ mathematical processes such as triangulation, trilateration, multilateration, or like, in determining the location of the transmission facility.

Triangulation is the process of finding coordinates and distance to a point by calculating the length of one side of a triangle, given measurements of angles and/or sides of the triangle formed by that point, such as the target transmission facility 202, and two other known reference points, such as the receiving antennas 104. The calculation of the location of the transmission facility 202 may then be performed utilizing the law of Sines from trigonometry. Tri-lateration is a method similar to triangulation, but unlike triangulation, which uses angle measurements, together with at least one known distance, to calculate the subject's location, tri-lateration uses the known locations of two or more reference points and the measured distance to the subject, such as the transmission facility 202, and each reference point, such as the receiving antennas 104. Multi-lateration, or hyperbolic positioning, is similar to tri-lateration, but multi-lateration uses measurements of time difference of arrival, rather than time of arrival, to estimate location using the intersection of hyperboloids.

While several radiolocation and triangulation techniques have been described in connection with locating the transmitting device, it should be understood that one skilled in the art would appreciate that there are other location methodologies and such location methodologies are encompassed by the present invention. For example, in embodiments, the location of a single antenna may be known and the single antenna may detect a transmitting device. The location of the transmitting device may be estimated through its known proximity to the single antenna location. This may provide adequate location resolution for certain applications of the technology. Similarly, two or more antennas may be used and each of the antenna locations may be known. When each of the antennas receives a transmission, the corresponding signal strengths may be compared. The one with the highest signal strength may be determined as the one closest to the transmitting device so the corresponding antenna location may provide enough location resolution for certain applications.

In an embodiment of the transmission detection, identification, and reporting system 100, a corrections facility, with its substantial and inherent obstruction 102 rich environment, presents an ideal example of how the transmission detection, identification, and reporting system 100 may significantly increase the detection of transmission facilities 202 such as mobile phones, a significant challenge to authorities of the correction facilities. In this embodiment, the system maybe placed throughout the corrections facility for the purpose of alerting the corrections staff that cell phone activity is taking place, the time of the activity, the location of the activity and the type of device or service i.e., Nextel, T-Mobile, Verizon, and the like. In another example of an embodiment of the transmission detection, identification, and reporting system 100 may be placed on the perimeter of a selected area for the purpose of alerting school officials, neighborhood watch programs, homeland security personnel and/or law enforcement that cell phone and/or transmission facility movement and/or activity is taking place, within the parameter of the area covered. The time of the activity, the location of the activity and the type, i.e., transmission facility identification, such as, Nextel, T-Mobile, Verizon, and the like, may also be determined and provided. A further embodiment of the system suitable for school safety includes the identification of all cell phone usage within the facility. In this embodiment the integration with a CCTV apparatus, with positional coordinates, the transmission facility and the sensor array nodes have audio, video surveillance capability with biometric and alert technologies, such as bomb detection, bio-hazards, prohibited substances detection and the like. In an embodiment of the transmission detection, identification, and reporting system 100 may also direct other types of transmission detection, identification, and reporting system 100 to focus on a specific transmission facility and the like. In an embodiment of the transmission detection, identification, and reporting system 100 may provide energy conservation methodologies, such as idle mode and the like, to reduce the power requirements of battery or solar powered equipments. The technologies described herein may also allow for standalone detection units incorporated in a transmission facility or a set of detection units to detect transmission devices in schools, buildings and other environments in which the facility's or area's provider does not wish the use of cell phones and is interested in the detection of cell phone use.

Figure 3:
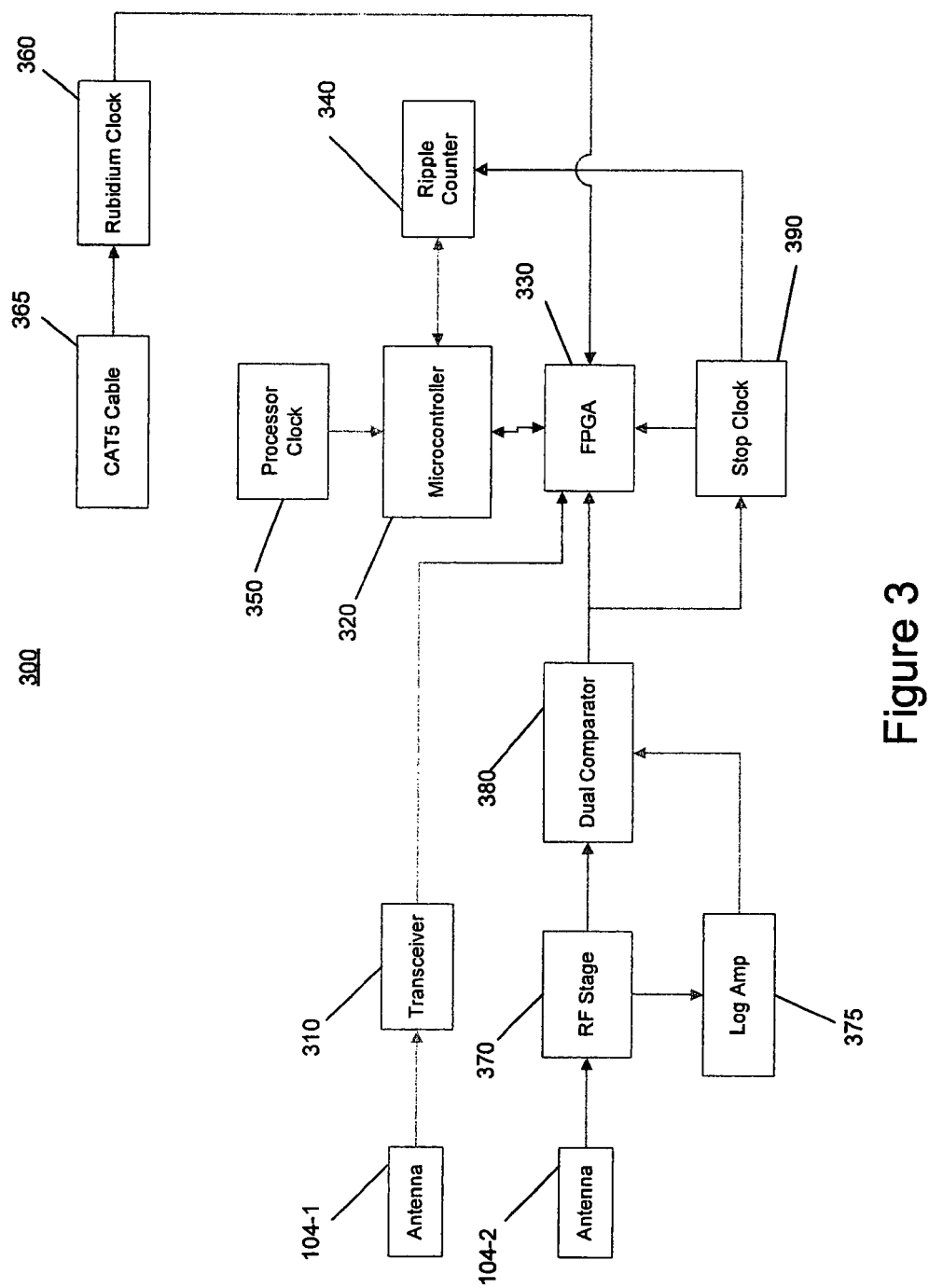
FIG. 3 illustrates a block diagram of a sensor apparatus in accordance with the principles of the invention.

FIG. 3 illustrates a high-level block diagram of an exemplary sensing system in accordance with the principles of the invention. In this illustrated embodiment, antenna 104-1 receives low power data signals from a transmission facility or wireless transmission device (not shown). The data signal is provided to transceiver (transmitter/receiver) 310 that down-converts the data signal and provides the data signal to process 330. In this case, processor 330 is implemented as Field-Programmable Gate Array (FPGA). Processor 330 may similarly be presented as a general purpose processor unit or an Application Specific Integrated Circuit (ASIC).

Antenna 104-2 receives a Radio Frequency (RF) signal and provides the RF signal to RF stage 370 for down-converting and amplification. The down-converted signal is then applied to a "log" amplifier 375. Log amplifiers are known in the art to provide a gain value to a received signal based on the magnitude of the received signal. In this case, the gain is applied according to a logarithmic function rather than a linear function. The output of RF stage 370 and log amplifier are applied to a dual comparator 380.

One output of the dual comparator 380 is applied to FPGA 330 and one output is applied to a stop clock circuit 390, which determines a time when a designated received pulse is detected. FPGA 330 provides an enable signal to the stop clock circuit 390. An output of the stop clock circuit 390 is applied to a ripple circuit, which maintains an accurate time to determine a accurate time when the designated received pulse is detected.

Also shown is a high-accuracy clock 360 that provides a clock signal to FPGA 330. Preferably, clock 360 is a rubidium clock having a measurement accuracy in the order of picoseconds. The rubidium clock 360 may be connected to a dedicated category 6 cable that allows for allowing connection of one or more devices requiring a high-accuracy clock signal.

Processor clock/FPGA clocks 350 are provided to the respective devices for the internal operation of these devices. The processor clock and FPGA clock signals may be generated independently.

Figure 4:
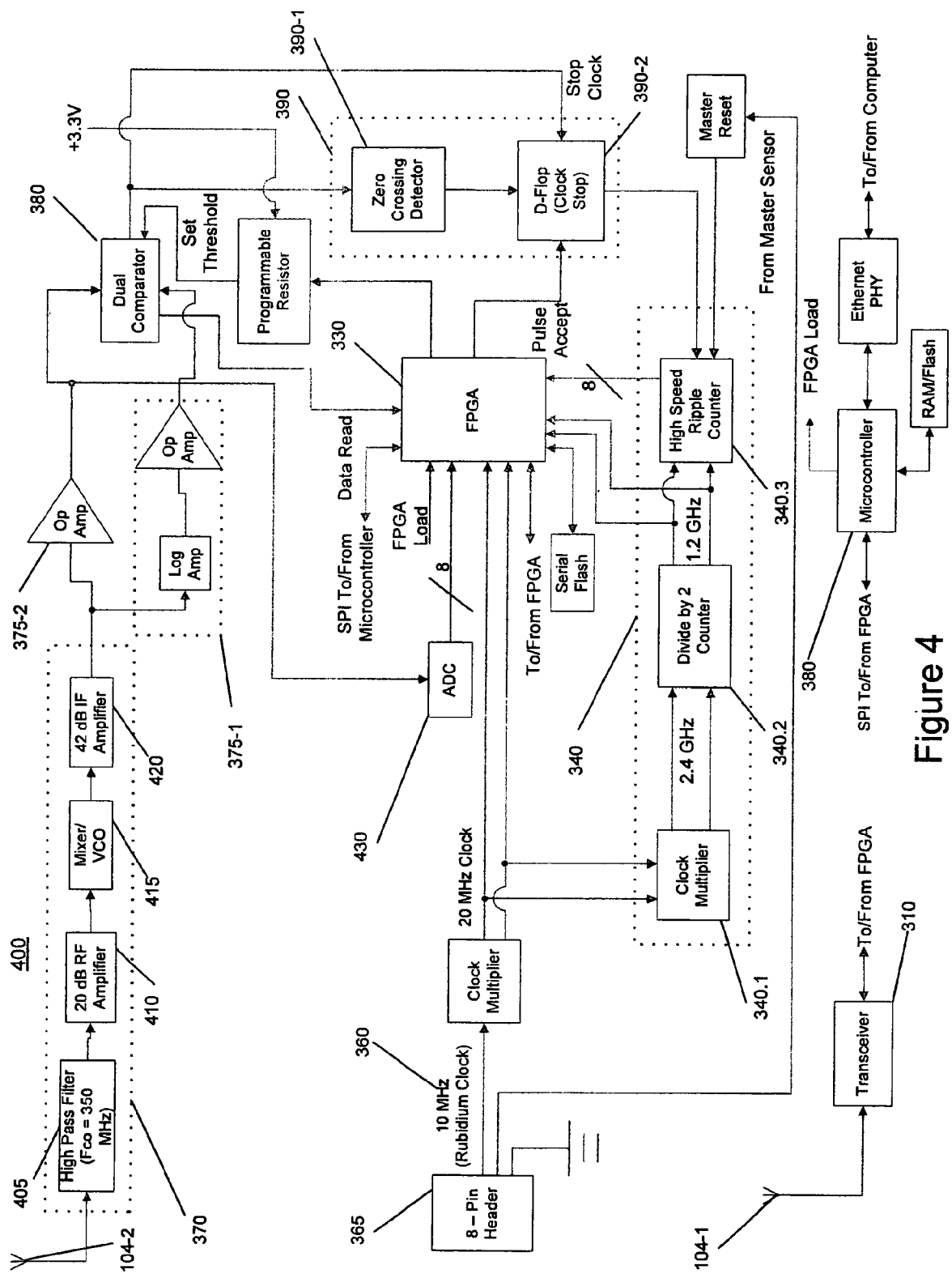
FIG. 4 illustrates a second block diagram of a sensor apparatus in accordance with the principles of the invention.

FIG. 4 illustrates a further detailed block diagram implementation f a sensing system in accordance with the principles of the invention. In illustrated embodiment, antenna 104-1 receives a data signal, as previously described, and applies the received signal to transceiver 310. The output of transceiver 310 is applied to FPGA 330. In one aspect of the invention, the data signal is transmitted on a carrier frequency of 434 Mhz. Antenna 104-2 receives a signal and applies the received signal to RF stage 370. RF stage 370 is composed of a low-pass filter 405 to remove high frequency signals, a 20 db (decibel) amplifier 410 to amplify the remaining received signal, a mixer 415 to down-convert the received signal to a known baseband signal and a second amplifier 420 to amplify the baseband signal. The output of the RF stage 370 is applied to log amplifier 375. Log amplifier 375 is composed of log amplifier 375-1 and operational amplifier 375-2. Log amplifier 375-1 amplifies the received signal based on a logarithmic function, as previous described, and operational amplifier 375-2 amplifies the received signal based on a linear function.

The output of the operational amplifier 375-2 is applied to a Analog/Digital Converter 430 that digitizes the received signal, which is then applied to FPGA 330. In addition, the output of each of the log amplifier and the operational amplifier is applied to a dual comparator 380, which compares the applied inputs to known threshold values to reduce spurious signals. The log amplifier signal and the operational amplifier are each applied to the FGPA 330 and the output of the operational amplifier is further applied to a stop clock circuit 390. Stop clock circuit 390 is composed of a zero-crossing circuit 390-1 and a trigger device 390-2 (e.g., a D-flip flop). Zero-crossing circuit 390-1 are known in the art to provide an indication when a modulation of a signal crosses a zero-voltage value. The zero-crossing indication is then provided to trigger circuit 390-2 which provides a digital representation of the zero-crossing.

The digital representation output of the clock stop circuit is next applied to the ripple counter circuit 340. In this illustrated embodiment, ripple counter circuit 340 is composed of a clock multiplier 340.1 that multiples a clock signal received from FPGA 330. The multiplied clock is provided to a divide by two circuit 340.2 to reduce the clock rate. The reduced clock rate is applied to a ripple counter 340.3. In this illustrated case, the ripple counter 340.3 provides a signal to FPGA when a stop clock signal is received from stop clock circuit 390.

In a preferred embodiment, a 160 MHz clock is provided to clock multiplier 340.1 which produces a clock rate of 2.4 GHz. The 2.4 GHz clock is divided to a clock rate of 1.2 GHz to operate ripple counter 340.3 The output of the divide by two device is presented to the FPGA, representing the most significant bit, prior to the ripple counter. In this case the ripple counter 340.3 operates in the order of nanosecond resolution. Although, the clock rate is shown as being increased and then decreased, this is merely a function of an implementation and is not to be considered the only means of generating a clock signal or that the clock is limited to a 2.4 GHz signal.

FPGA in 330 receives a ripple counter value associated with stop clock indication. The ripple counter value represents a time value, which in conjunction with similar ripple counter values may be used to determine a location of a cell phone or similar transmitting device, as is described with regard to FIGS. 7A-7B.

FIG. 5A illustrates an exemplary message protocol in accordance with the principles of the invention. In this exemplary message, a preamble message 510 is composed of a plurality of data bits represented as 510.1-510.$n$. Each of the data bits 510.1-510.$n$ may represent one or more additional bit. For the purposes of describing the principles of the invention, each illustrated data bit 510.1-510.$n$ represents a single data bit. The preamble message may represent an identification of a user, a characteristic of a user, biometric data of a user or combinations thereof. Preamble 510 further represents a marker and a trigger that identifies the beginning of the reception of a transmission of particular user. In one aspect of the invention the number of bits in preamble 510 is fixed at sixteen (16). However, it would be recognized that the number of preamble bits may be selected based on desired transmission characteristics and have been contemplated and considered within the scope of the invention described herein.

After reception of a number of known preamble bits 510.1-510.$n$, a pulse projection window 515 is open for a known period of time to capture the occurrence of a next pulse 530 in the pulse sequence. This next pulse is referred to as clock stop pulse. The clock stop pulse is used to accurately determine end of transmission as described with regard to FIG. 4. Clock stop pulse 530 is further composed of a plurality of individual pulses 530.1-530.$n$, that are distributed among the clock stop pulse. The detection of at least one pulse 530.1-530.$n$ satisfying at least one known criterion is used as a time marker to mark the end of transmission from a user.

In one aspect of the invention, the preamble pulses are selected as being of a duration of 71 nanoseconds uniformly distributed over a 1.136 microsecond time frame. The pulse window is established as 50 nanoseconds and each of the pulses 530.1-530.$n$ within clock stop pulse 530 are represented as 32 pulses of a 2.2 nanosecond duration. It would be recognized that the preamble described herein is representative of a single aspect of the invention and that the particular values described herein are provided to limit the scope of the invention to this value.

Figure 5B:
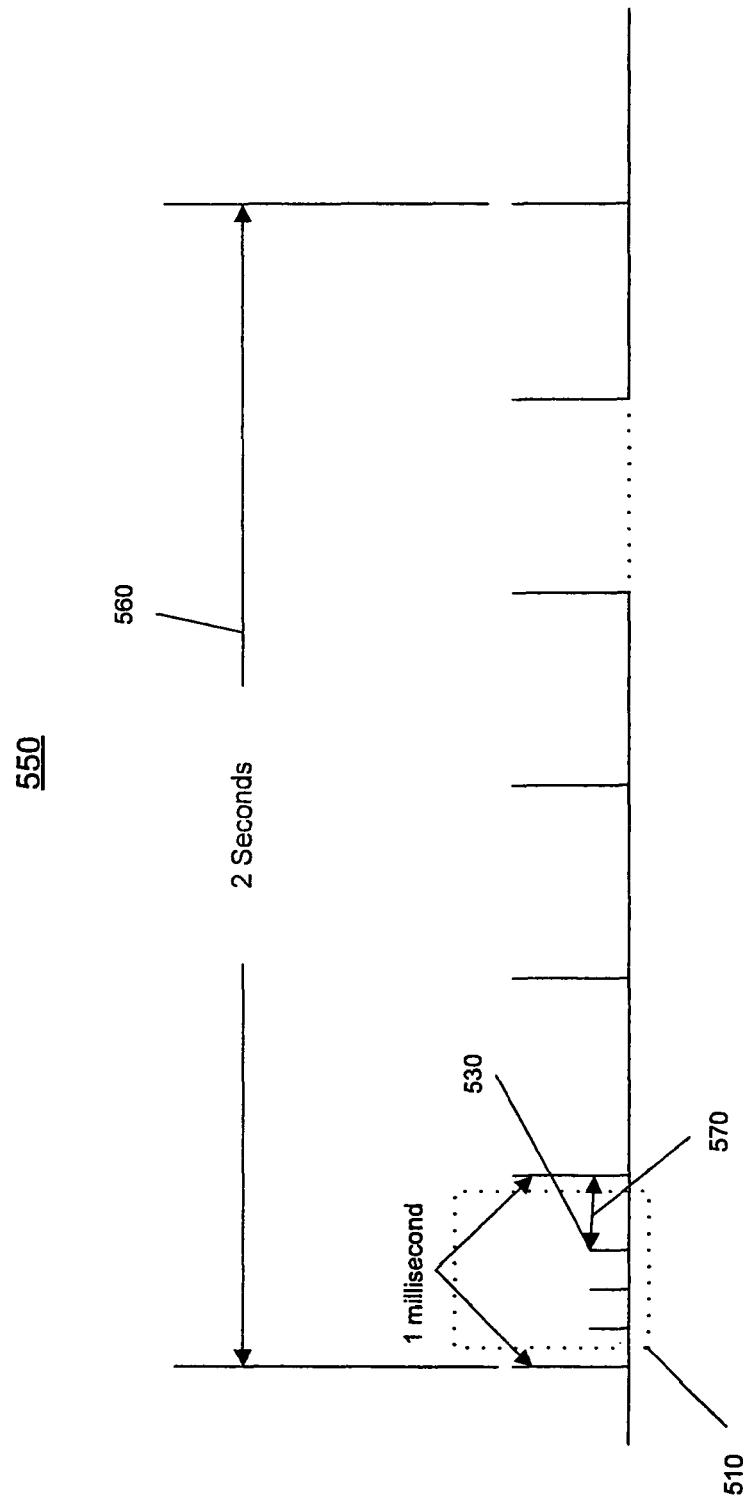

FIG. 5B illustrates an exemplary Time Division Multiple Access (TDMA) protocol 550 in accordance with the principles of the invention. In this exemplary protocol, each user is assigned a time slot in which a user may transmit a message to a sensor or substation (see FIG. 1) by the central office. The time slot assignment may be established dynamically by the central office 110 or substation 108 based on the number of users within a general range of the central office. In another aspect, each of the users may have allocated a predetermined time slot and when the user enters a general area managed by the central office or substation, the central office 110 or substation 108 may register the user and determine whether conflicts may exist. Conflict resolution may for example be resolved by incorporating a CDMA (Code Division Multiple Access) protocol (not shown) on each of the conflicting users. In this case, two users may thus transmit in the same time slot by the central office assigning and providing a known code to each of the conflicting users. CDMA technology is well known in the art and need not be discussed in detail herein.

In the illustrated protocol shown, each user is allocated a one millisecond (1 ms) time slot 550 (or a time slot which varies from 500 microseconds to 20 milliseconds) in which to communicate with a sensor. That is, the preamble 510 is received substantially at the beginning of the time window, as each user is synchronized to the time frame 560. The stop clock bit 530, when received marks the end of the reception of the user preamble, which may include identification information. The remaining time 570, in the time slot 510, may be utilized for the transmission of additional information, e.g., type of device, biometric data, text data, voice data, etc., to the central office or substation. For example, the biometric data may include information such as heart rate, pulse rate, temperature or with appropriate placement of one or more transmitting devices, an electrocardiogram.

In this illustrated example, the time frame 560 is selected as two (2) seconds to accommodate up to 2000 users, without CDMA encoding. However, it would be recognized that the time slot and/or time period may be adjusted based on the type and number of expected users with the system. For example, in critical situations, the time period may be adjusted to a smaller value to provide faster updates of the location of a user. As would be recognized, synchronization of the wireless transmission devices with respect to the frame is performed periodically to insure the correct time relationship between the wireless devices and the frame.

Figure 6:
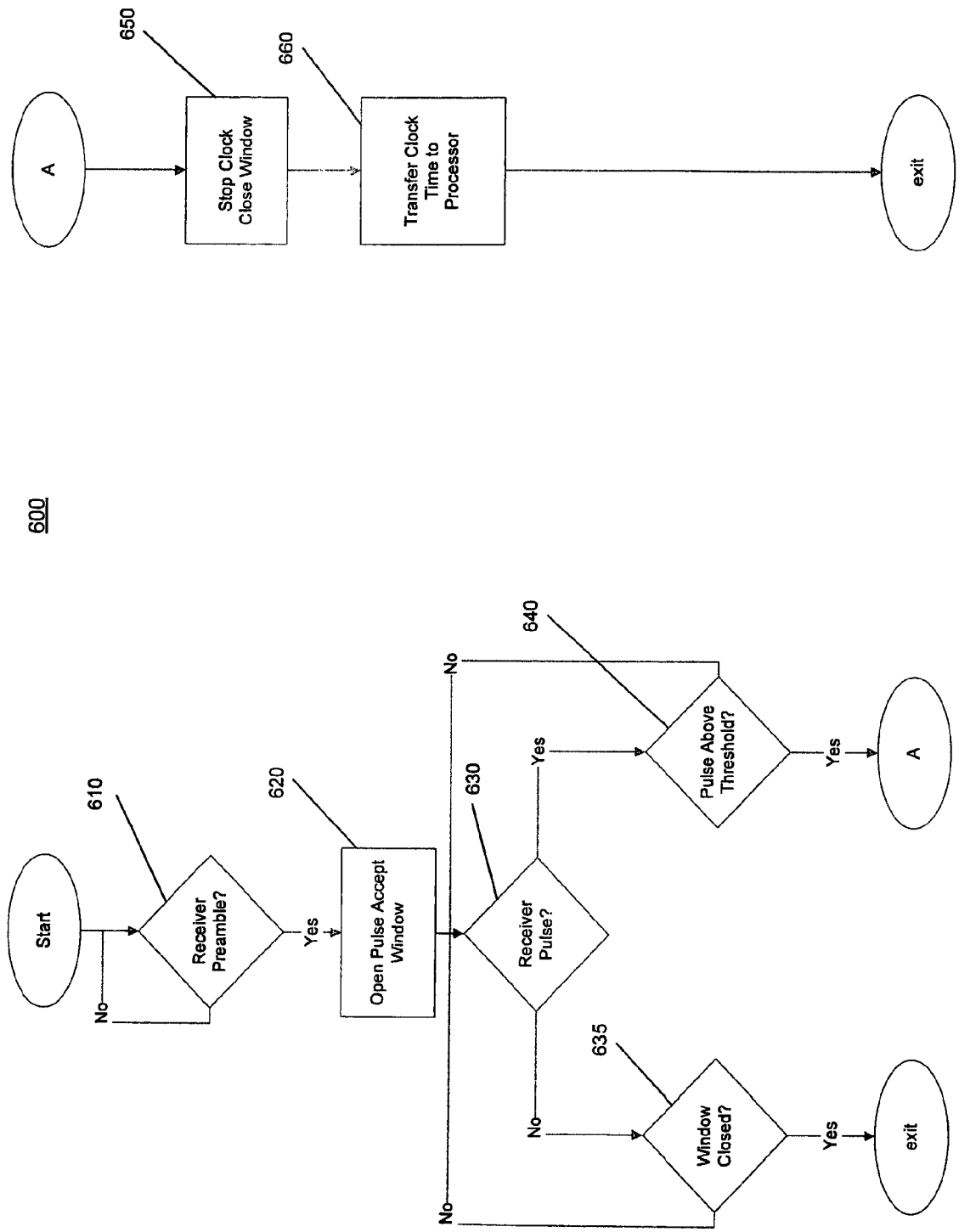
FIG. 6 illustrates an exemplary process for identifying wireless communication systems in accordance with the principles of the invention.

FIG. 6 illustrates a flow chart of an exemplary process 600 for determining a time of receiving information from a user in accordance with the principles of the invention. In this exemplary process 600, a sensor is turned on to accept an assigned user identification during a selected time slot (not shown). A determination is made at block 610 whether the preamble (510, FIG. 5a) is received. If the answer is negative, then processing continues to test the receipt of the preamble. This process is performed until the time slot expires and a new identification is searched for.

However, when the preamble is received, a time projection window is opened at block 620. At block 630, a determination is made whether the stop clock pulse (530, FIG. 5A) is received. In this case, a reference to clock stop pulse 530, any of the clock stop subpulses 530.1-530.n, may be used to indicate that the clock stop pulse 530 has been received.

If the answer is negative, then a determination is made whether the time of the window has expired. If the time of the projection window has not expired, then processing continues to monitor whether the stop clock pulse has been received (block 630).

However, if the clock stop pulse (or at least one of the clock stop subpulses 530.1-530.n) is received, then a determination is made whether a measured amplitude of the received clock stop pulse is above a threshold value at block 640. If the amplitude is below the threshold value then processing continues to monitor for a received pulse at block 630.

However, if the measured amplitude is above a threshold value then processing continues at block 650, wherein a stop clock indication (e.g., time) is made wherein the time of the received pulse is determined and the projection window is closed. The time of the received stop clock indication is provided to a processor at block 660 for further analysis.

Although not shown, it would be appreciated that the threshold value may be determined dynamically based, for example, on an average of the measure amplitude of each of the received pulses in the preamble 510. In another aspect, the threshold value may be determined based on the measured amplitude value of those pulses in the preamble that lie within a known level with regard to the maximum amplitude value. In either aspect, the threshold value may then be determined as being a known level below the measured amplitude of the preamble pulses. In still another aspect, the threshold value may be set at being a known level above and below the measured amplitude to the preamble pulses. For example, a threshold value may be established as 1 decibel (db) above and below a measured amplitude of the pulses in the preamble. In this example, a pulse is only accepted when it is detected during the projected window (temporal criterion) and within an amplitude range (amplitude consistency criterion).

Figure 7A:
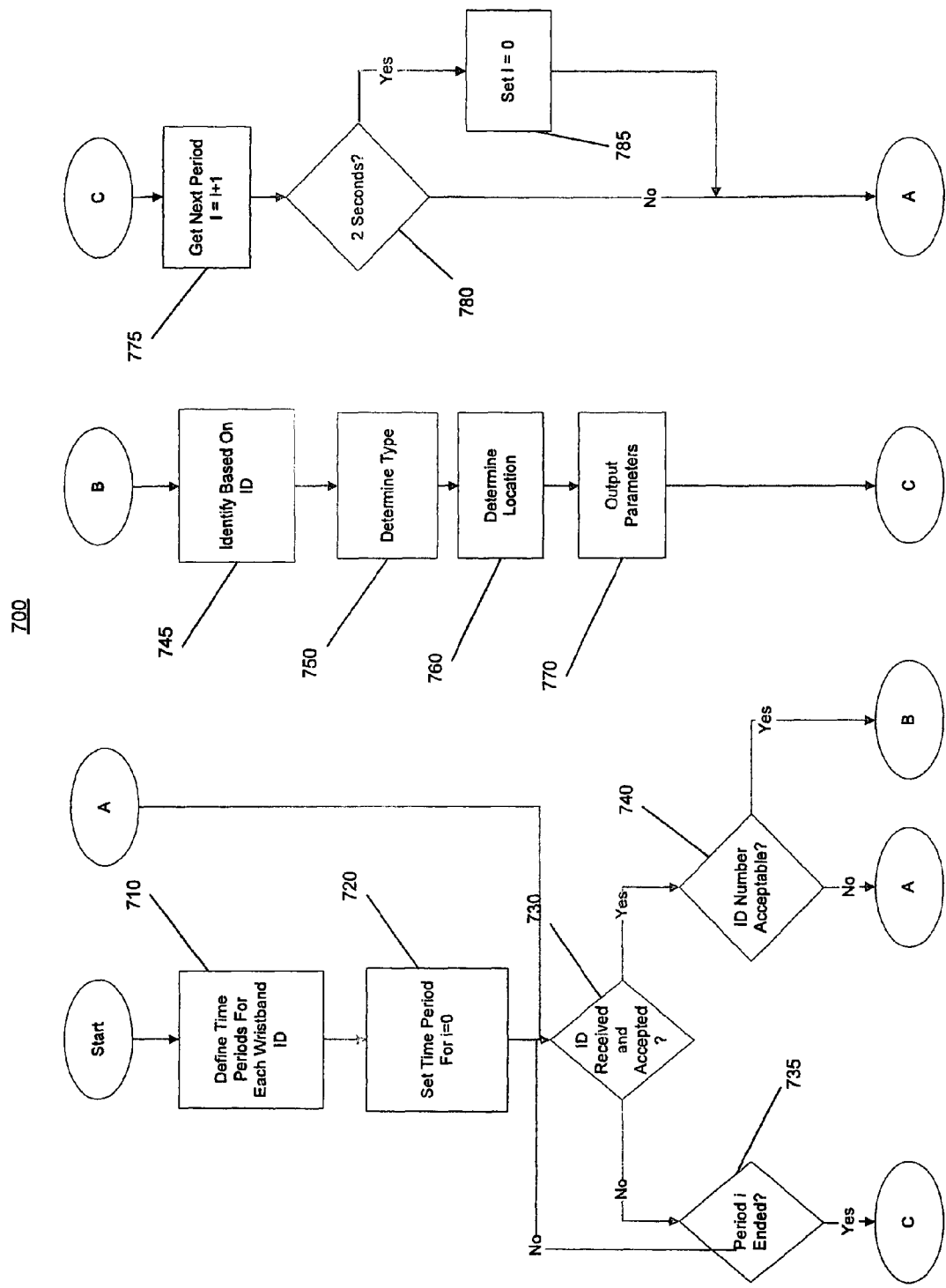
FIG. 7A illustrates an exemplary process for tracking a wireless communication in accordance with the principles of the invention.

FIG. 7A illustrates a flow chart of an exemplary process 700 for determining a location of a wireless transmission in accordance with the principles of the invention. In this illustrated embodiment, time slots are assigned to each user in a network at block 710. As previously discussed, this assignment may be based on the number of users, a time frame and a time slot length. At block 720, an index is set for each time slot within a time frame. At block 730 a determination is made whether an identification associated with the user assigned to the time slot has been received. As previously discussed, this identification may be included within the preamble that is received during the time slot (see FIG. 5B). If the identification has not been received then a determination is made at block 735 whether the time slot has ended. If the answer is negative, the processing continues at block 730.

However, if the identification has been received, then a determination is made whether the identification is associated with the designated time slot at block 740. If the answer is negative, the processing continues at block 730 to wait the correct identification.

However, if the identification is acceptable, then the user is identified based on the identification at block 745, the type of device may be determined at block 750 and a location may be determined at block 760, using triangulation techniques, as previously discussed. At block 770, the parameters associated with the user may then be output to a display device, for example.

Returning to block 735, if the time period associated with the time slot expires, then processing continues at block 775 wherein a next time period is selected. At block 780, a determination is made whether all the time slots in the frame have been scanned. If the answer is in the affirmative, then the value associated with the time slot is reset to repeat the processing at the beginning at the time frame.

Although not shown, it would be appreciated that processing of identification and/or determination of type of device in blocks 745 and 750, respectively, may be performed prior to accepting the identification in block 740. Similarly, the determination of the acceptable identification may be removed without altering the scope of the invention.

Figure 7B:
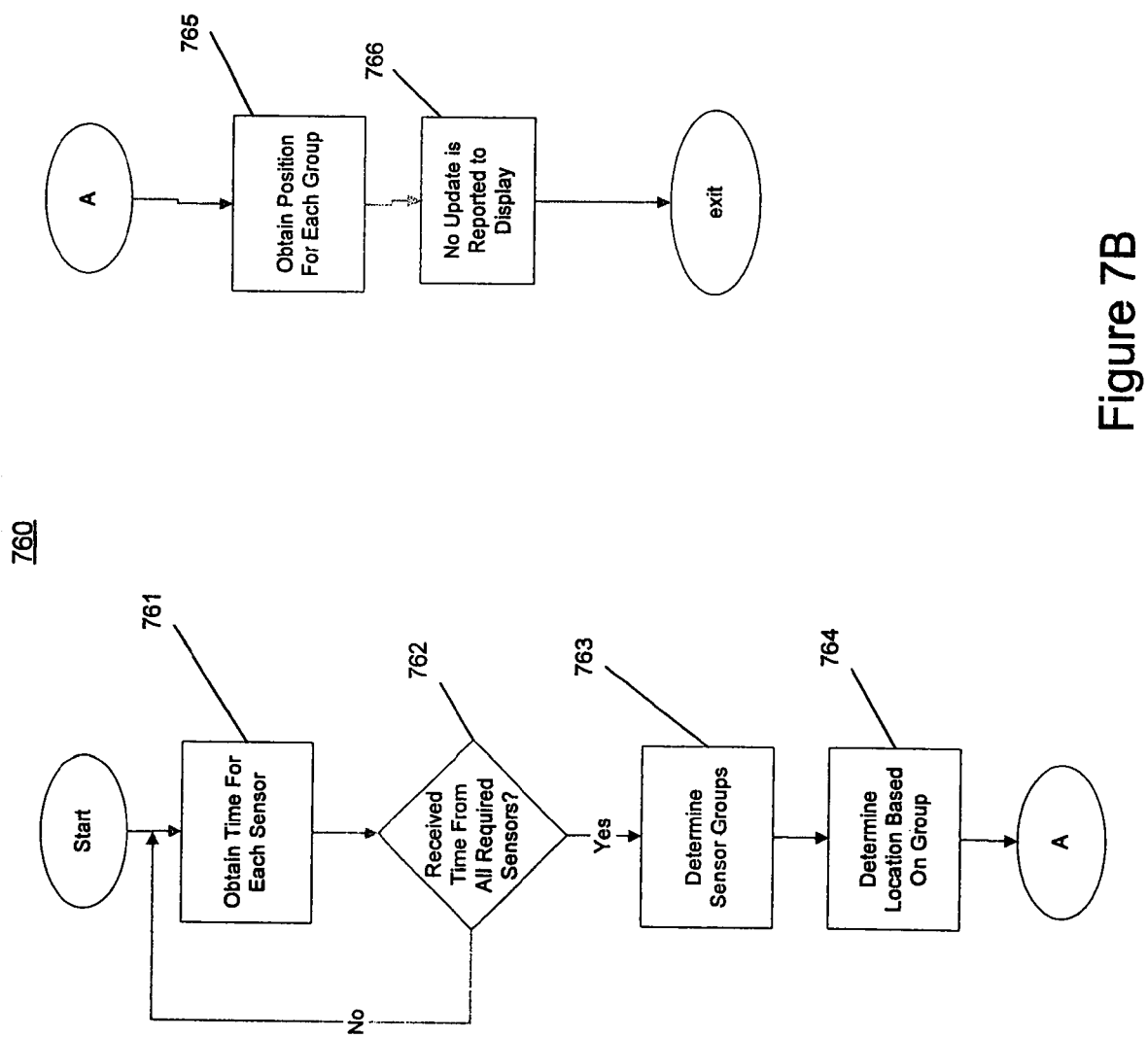
FIG. 7B illustrates an exemplary process for locating a wireless transmission in accordance with the principles of the invention.

FIG. 7B illustrates a flow chart of exemplary process 760 (see FIG. 7A) for determining a location or position of a transmitting facility in accordance with the principles of the invention. In this illustrated embodiment, a time value is obtained from each of the sensors within the network at block 761. At block 762 a determination is made whether a sufficient number of time values have been obtained. If the answer is positive, then groups of times are formed at block 763, wherein each group includes selected ones of the time values.

At block 764 a position or location is determined based on each group of times. In one aspect of the invention, the location based on a group of times may be determined using a linear algebra based algorithm. The linear algebra based algorithm is well known in the art and need not be described herein.

At block 765 each of the positions obtained from the groups of times is obtained and at block 766 a final position is determined as a function of the obtained positions. For example, a final position may be determined as an average of the obtained positions. In another aspect, selected ones of the obtained positions may be used for determining a final position.

As an example, when six (6) sensors are included in the system, with times designated at $T_1$-$T_6$, two groups of times ($T_1$-$T_5$ and $T_2$-$T_6$) may be formed and a position obtained for each of these two groups. While a position may be determined based on at least three time values within a group in a horizontal plane, in a preferred embodiment of the invention at least five (5) time values within each group are utilized. The use of five time values is preferable to account for vertical displacement of the transmitting facility and it has been found the use of five time values converges to a solution faster than four time values.

Figure 8A:
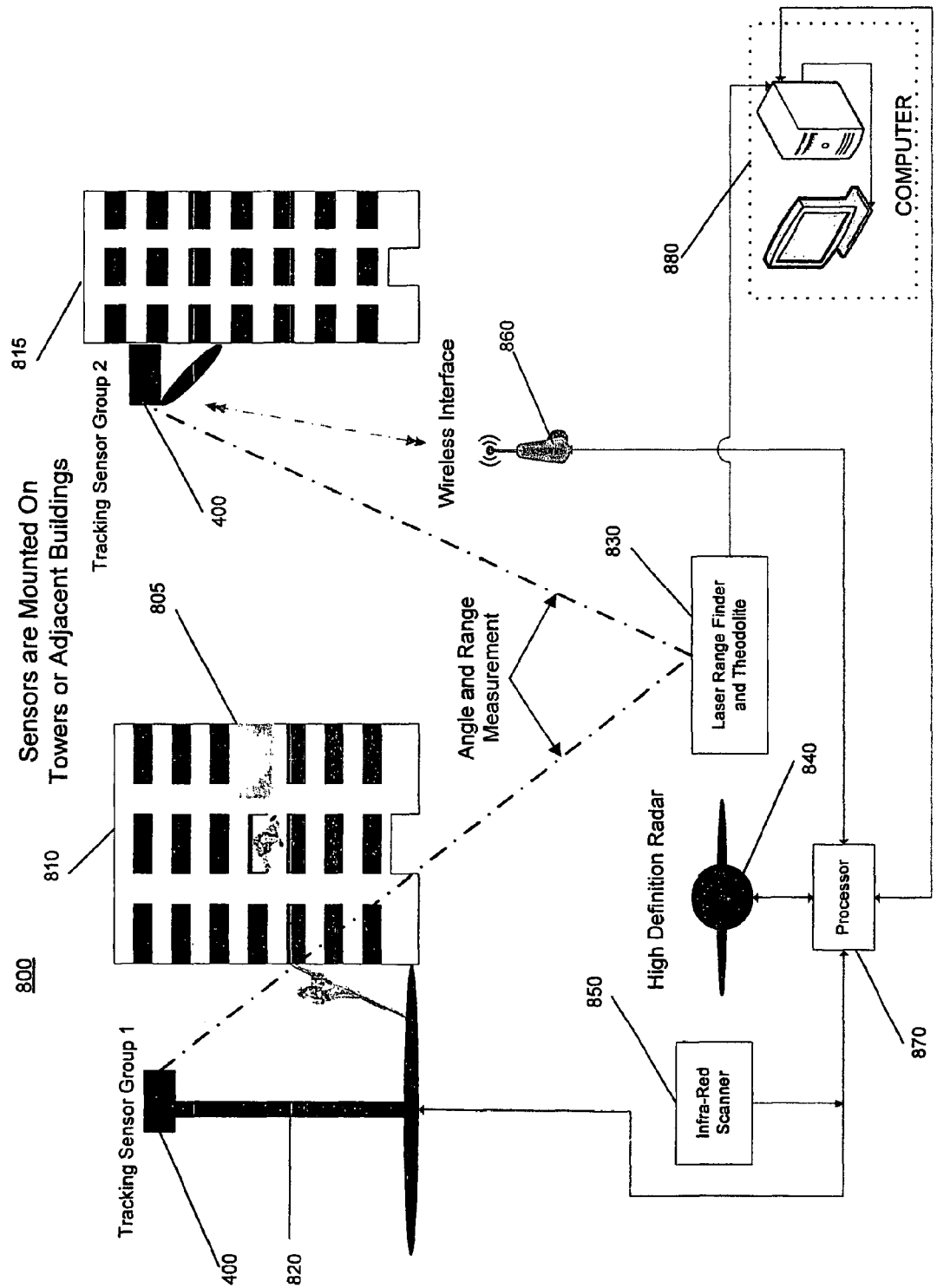
FIGS. 8A-8C illustrate further exemplary applications of the detecting, tracking, and locating system in accordance with the principles of the invention.

FIG. 8A illustrates an exemplary application of the system described herein. In this exemplary application, which is associated with a fire fighting situation, of identifying, monitoring, tracking and locating a fire fighter 805 located in building 810.

In this illustrated exemplary application, one or more sensors 400 may be located on building 815 or a tower 820 adjacent to the building 810. In one aspect of the invention, the location of the sensors may be built into command vehicles, wherein the sensors may be placed in a configuration that provides for best determining location of the firefighter. The fire fighter 805 may have on his/her person a wireless transmission device, e.g., a cell phone or a special purpose device. The special purpose device may be a transceiving device (wireless device) that may be attached to a wrist (a wrist band), pinned to a garment or attached around a neck (a badge). The wireless transmission device may further provide emergency notification capability incorporation (i.e., alarm alert, panic button, audio communication capability, biometric information, altitude and attitude indication). The wireless transmission device may be pre-loaded with an identification code or the identification code may be dynamically assigned and downloaded to the wireless transmitting device at the moment the device is needed. Thus, the location of each of the firefighters 805 may then be monitored, tracked and located as previously disclosed as the sensors 400 provide identification of firefighter 805 via a wireless communication link to wireless interface 860. Computer 880 may then correlate the information from each of the sensors to determine a location of firefighter 805.

Although the principles of the invention are applicable to the illustrated example, it would be recognized that in this dynamic situation, the location of the sensors are not determined a priori nor is the general configuration of the building 810 known. Hence, to provide proper location of firefighter 805 locations of sensors 400 and a general layout of the building 810 is needed. To determine the location of the sensors a laser range finder and theodolite 830 may be used. The theodolite may determine the position, both horizontal and vertical with respect to the position of the theodolite. The position of the theodolite may be determined based on a GPS (Global Positioning Satellite) system. In one aspect, the sensors 400 may also include a GPS receiver, which may provide the location of the sensor 400 via a wireless communication link to interface 860. In addition, a high definition RADAR 840 may be used to map the interior elements of building 810. This mapping may be performed periodically to account for changes in the structure of building 810. The information from the RADAR 840 may be provided to a processor 870 that correlates the location of firefighter 805 with the current structure of building 810. It would be recognized that such correlation may be performed in computer 880 also. In another aspect, an infrared scanner 850 may be incorporated to determine the location of hot spots within building 810. In this illustrated system 800, computer 880 may for example, direct a firefighter 805 toward or away from hot spots depending upon the situation that is occurring within building 810.

Figure 8B:
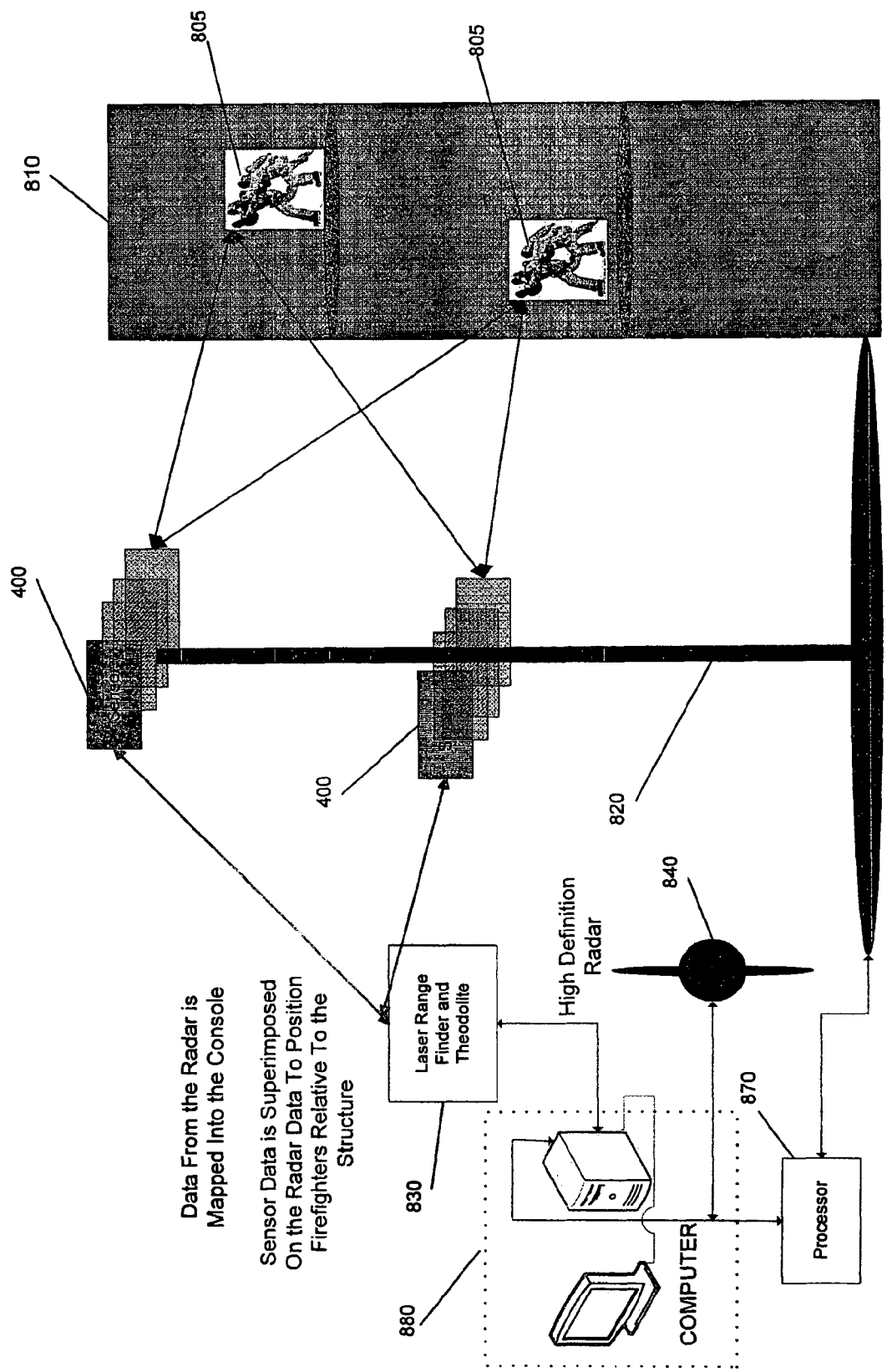

FIG. 8B illustrates another exemplary application of the system described herein. In this exemplary application, multiple sensors 400 are positioned vertically on tower 820 to provide accurate location of each of the firefighters on different levels within building 810. Computer system 880, as previously discussed, may correlate the interior structure of each floor of building 810 to accurately locate the position of firefighter 805.

Figure 8C:
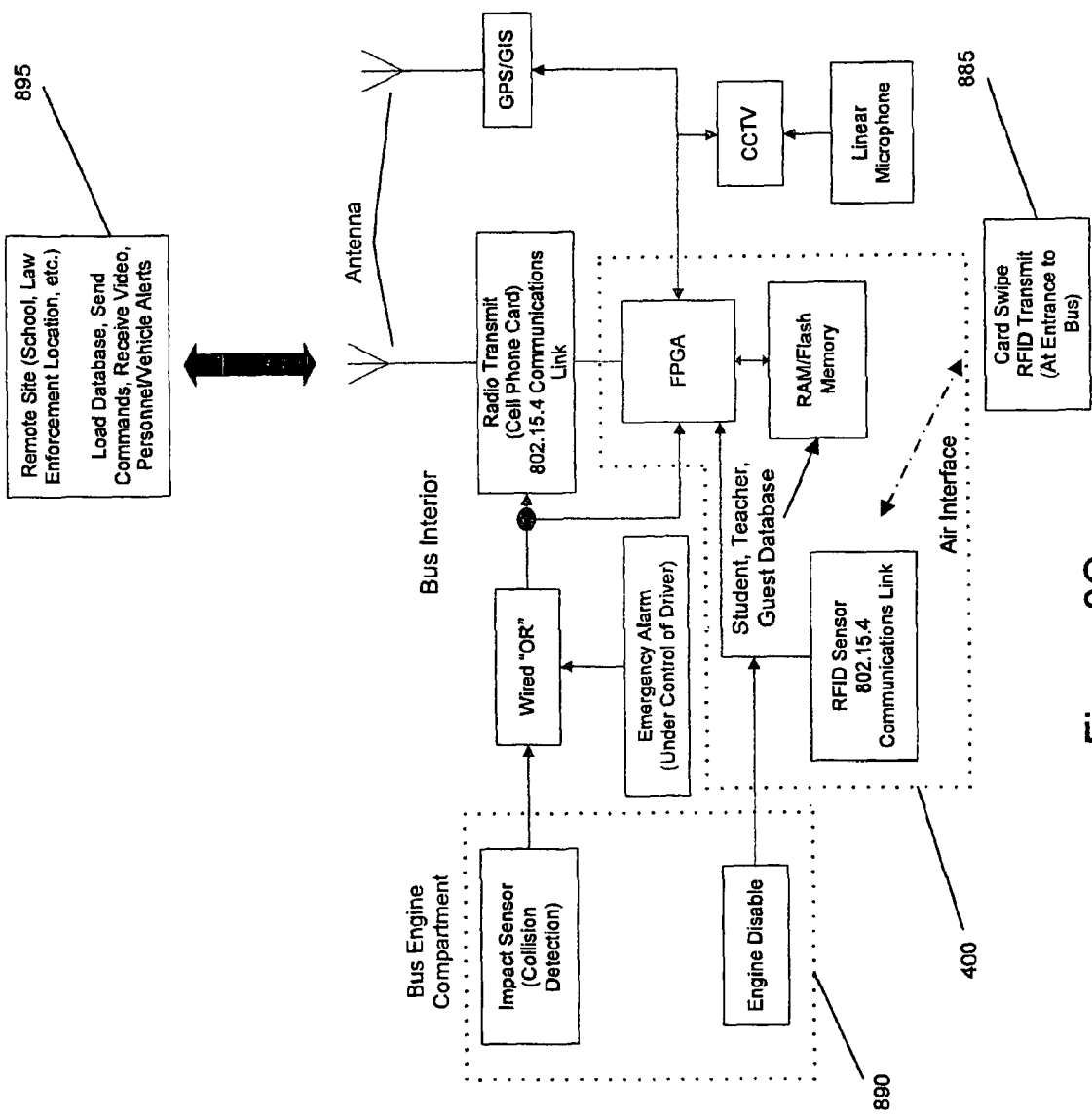

FIG. 8C illustrates another exemplary application of the system described herein. In this exemplary application, sensor 400 may be included on a school bus, for example, wherein each student is allocated a badge 885 that is detected upon the students entry to the bus. Detection and identification is performed in a manner as shown in FIG. 7B. The identification and status of each person (student, parent, driver) may then be provided to central office 895 that maintains a register of the persons on the school bus. In the case of an accident, for example, information regarding the bus may be determined by collision or impact sensor 890 and provided to the central office 895. The central office having a registration of the persons on the bus may then provide information to parents, school officials, and police. In this aspect of the invention, the bus itself may include a long-range wireless transmitting device (previously discussed) or transmission facility (as earlier discussed for outside applications) or a GPS system (not shown) that determines the location of the bus.

Figure 9:
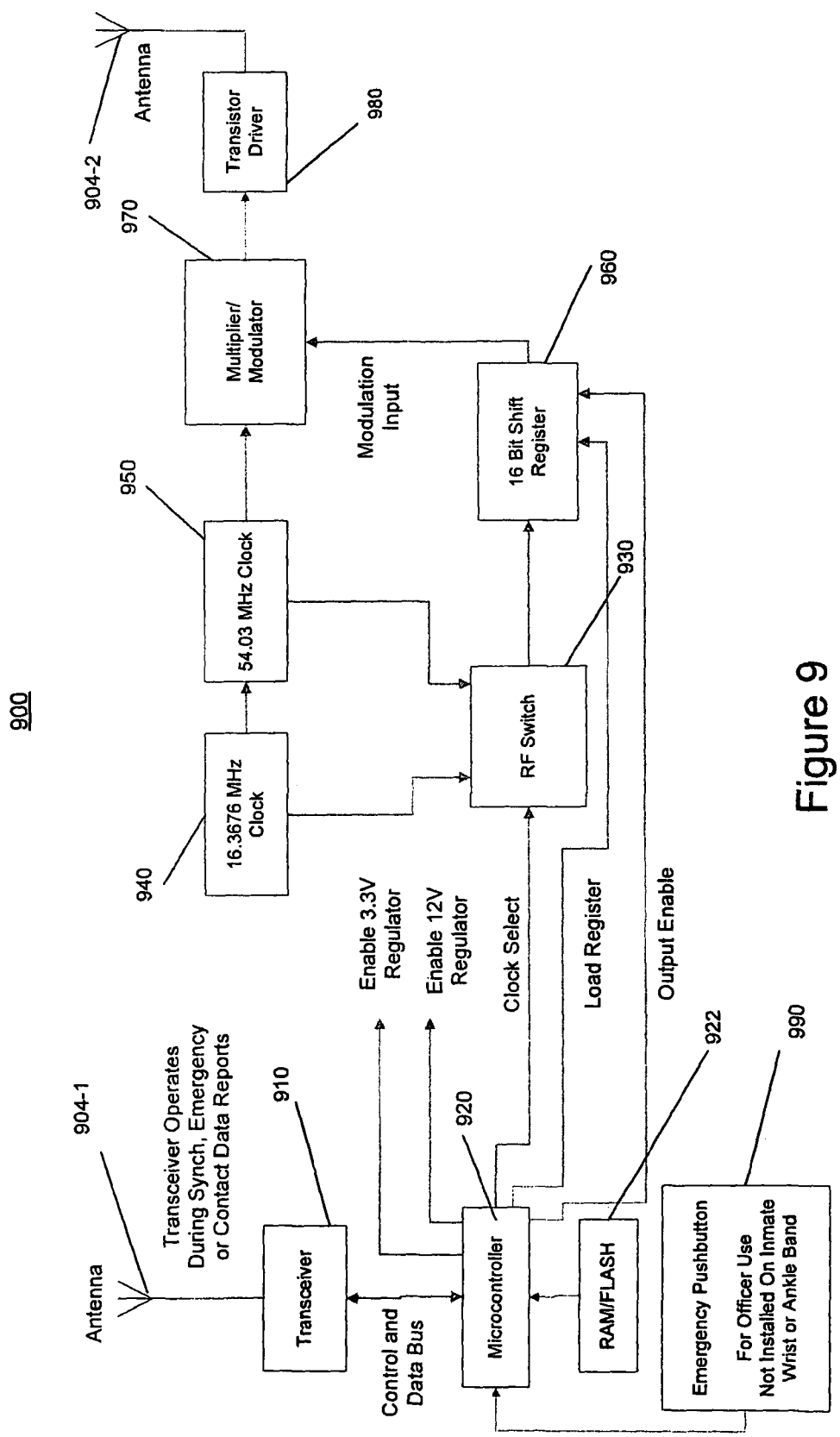
FIG. 9 illustrates a block diagram of an exemplary remote device in accordance with the principles of the invention.

FIG. 9 illustrates a block diagram of an exemplary wireless transmission device 900 in accordance with the principles of the invention. In this illustrated exemplary, device 900 includes antenna 904-1 receiving a signal from sensor 400 (not shown). The signal may include a synchronization pulse, an identification code, and/or a time slot indication within a frame allocated to the device. The provided signal is down-converted by transceiver 910 and the signal is applied to microcontroller 920. Microcontroller 920 may be in communication with memory 922, which may include instructions or code for controlling the processing of microcontroller 920. Memory 922 may also be preloaded with an identification code or provide storage for information received from sensor 400. Processor 920, when active during the allocated time slot, may provide control to shift register 960 to cause the output of the preamble message (see FIGS. 5A and 5B) in the allocated time slot. The preamble bits are next provided to a modulator 970 to modulate a carrier signal (in this case 448 MHz). The modulated carrier is then provided to driver 980 for transmission via antenna 904-2.

Processor 920 further provides instruction to shift register 960 to output a clock stop pulse and a 56 MHz bit rate data package. In a preferred embodiment, the clock stop pulse is of a known duration and is not modulated by modulator 970.

RF switch 930 controls an input to shift register 960 in allowing one of a preamble signal, a clock stop signal or a data signal to be applied to shift register 960. Crystal clock 940 and multiplier 950 are used to generate a clock signal suitable for the pulse duration of the preamble bits. (see FIG. 5A). An emergency signal mode may further be incorporated as represented by block 990. In this case, a known emergency signal may be transmitted within the preamble code or in the data section (see FIG. 5B). This emergency signal may override other data that may be transmitted during this time period.

Figure 10:
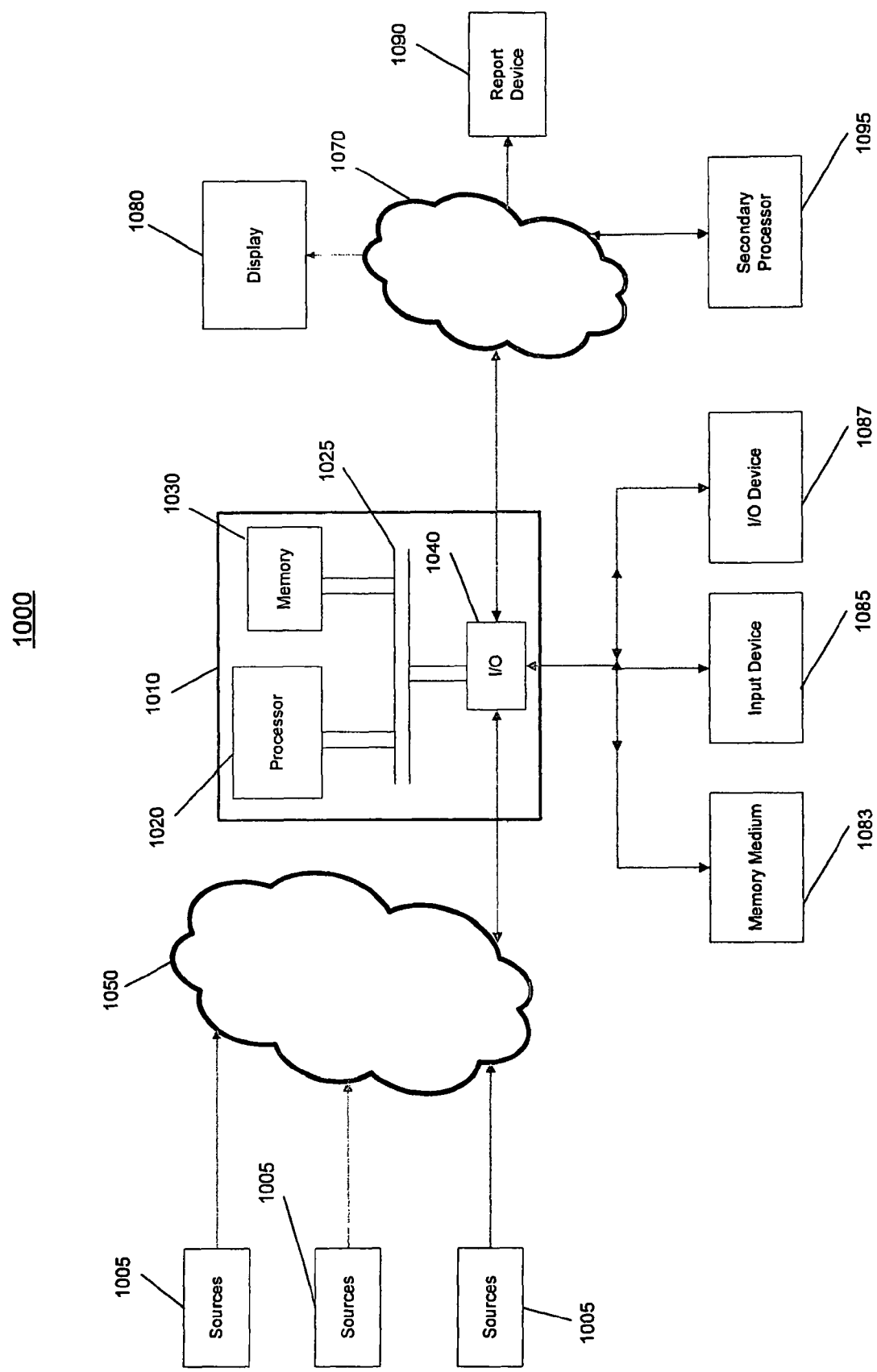
FIG. 10 illustrates a system for implementing the system in accordance with the principles of the invention.

FIG. 10 illustrates a system 1000 for implementing the principles of the invention as depicted in the exemplary processing shown herein. In this exemplary system embodiment 1000, input data is received from sources 1005 over network 1050 and is processed in accordance with one or more programs, either software or firmware, executed by processing system 1010. The results of processing system 1010 may then be transmitted over network 1070 for viewing on display 1080, reporting device 1090 and/or a second processing system 1095.

Processing system 1010 includes one or more input/output devices 1040 that receive data from the illustrated sources or devices 1005 over network 1050. The received data is then applied to processor 1020, which is in communication with input/output device 1040 and memory 1030. Input/output devices 1040, processor 1020 and memory 1030 may communicate over a communication medium 1025. Communication medium 1025 may represent a communication network, e.g., ISA, PCI, PCMCIA bus, one or more internal connections of a circuit, circuit card or other device, as well as portions and combinations of these and other communication media.

Processing system 1010 and/or processor 1020 may be representative of a handheld calculator, special purpose or general purpose processing system, desktop computer, laptop computer, palm computer, or personal digital assistant (PDA) device, etc., as well as portions or combinations of these and other devices that can perform the operations illustrated.

Processor 1020 may be a central processing unit (CPU) or dedicated hardware/software, such as a PAL, ASIC, FGPA, operable to execute computer instruction code or a combination of code and logical operations. In one embodiment, processor 1020 may include code which, when executed by the processor, performs the operations illustrated herein. The code may be contained in memory 1030, may be read or downloaded from a memory medium such as a CD-ROM or floppy disk, represented as 1083, may be provided by a manual input device 1085, such as a keyboard or a keypad entry, or may be read from a magnetic or optical medium (not shown) or via a second I/O device 1087 when needed. Information items provided by devices 1083, 1085, 1087 may be accessible to processor 1020 through input/output device 1040, as shown. Further, the data received by input/output device 1040 may be immediately accessible by processor 1020 or may be stored in memory 1030. Processor 1020 may further provide the results of the processing to display 1080, recording device 1090 or a second processing unit 1095.

As one skilled in the art would recognize, the terms processor, processing system, computer or computer system may represent one or more processing units in communication with one or more memory units and other devices, e.g., peripherals, connected electronically to and communicating with the at least one processing unit. Furthermore, the devices illustrated may be electronically connected to the one or more processing units via internal busses, e.g., serial, parallel, ISA bus, microchannel bus, PCI bus, PCMCIA bus, USB, etc., or one or more internal connections of a circuit, circuit card or other device, as well as portions and combinations of these and other communication media, or an external network, e.g., the Internet and Intranet. In other embodiments, hardware circuitry may be used in place of, or in combination with, software instructions to implement the invention. For example, the elements illustrated herein may also be implemented as discrete hardware elements or may be integrated into a single unit.

As would be understood, the operations illustrated may be performed sequentially or in parallel using different processors to determine specific values. Processing system 1010 may also be in two-way communication with each of the sources 1005. Processing system 1010 may further receive or transmit data over one or more network connections from a server or servers over, e.g., a global computer communications network such as the Internet, Intranet, a wide area network (WAN), a metropolitan area network (MAN), a local area network (LAN), a terrestrial broadcast system, a cable network, a satellite network, a wireless network, or a telephone network (POTS), as well as portions or combinations of these and other types of networks. As will be appreciated, networks 1050 and 1070 may also be internal networks or one or more internal connections of a circuit, circuit card or other device, as well as portions and combinations of these and other communication media or an external network, e.g., the Internet and Intranet.

Aspect of the invention, which are applicable in the fields of corrections, law enforcement and in society in general have contemplated the convergence of a plurality of technologies. In this case, the sensors may perform multi functions, as they may communicate both in a wired and wireless mode. The communications may be setup to work in a Wide Area Network (WAN) or a closed loop network, with known wireless protocols and access points. The sensors can detect multiple wireless transmissions, including those from conventional cell phone, and wrist bands, badges and transmission facility units, as described herein. The wrist bands can pass and receive audio, biometric, video, data and information to and from the sensors, and receive wireless communication and data/information from other wristbands and pass information and receive information to at least one $3^{rd}$ party application or device. The wrist bands transmission capability includes, sync, transceiver communication, and pico seconds rise-time transmission circuit, and a battery conservation circuit. The wristband includes at least one $3^{rd}$ party application or device and incorporates biometric, identification, alarm and alert functionality and circuitry. The sensors can also pass audio and video to a central unit, or receive wireless communication from each other sensor and pass that information to at least one $3^{rd}$ party application or device. Additionally, the central unit may accept data from the $3^{rd}$ party network and pass the data to the sensors to be broadcast out each node. An embodiment of the system is to provide communication to each cell, a user can receive and transmit audio video data, and phone services. The sensors are also designed to connect to smoke detector and other alarm detection devices, for example. The central interface, transmission detection, identification, and reporting system 100, and transmission facility, may be designed to communicate and integrate with existing systems and new CJIS compliant systems, via built-in active, passive radio technology. I.E offender management systems, commissary systems, medical records systems, inmate telephone systems, scheduling software may be provided by the methods described herein. The embodiment and central unit is designed to collect data on at least a portion of the wireless transmissions including time, status, biometric, environmental and location and the like. The embodiment of the system may dissect this information to make better decisions regarding on the environment within the sensor range of the sensors.

In this case, conditions such as heart attack detection, suicide prevention, stress analysis may be detected and provided to a central office. The transmission facility central interface, transmission detection, identification, and reporting system 100, embodiment can adjust its transmission, and/or sensitivity to conform to the building and/or outside environment. The control unit is designed to be stand alone or be able to handle multi-facility (buildings) coordination and display.

While there has been shown, described, and pointed out fundamental novel features of the present invention as applied to preferred embodiments thereof, it will be understood that various omissions and substitutions and changes in the apparatus described, in the form and details of the devices disclosed, and in their operation, may be made by those skilled in the art without departing from the spirit of the present invention. It is expressly intended that all combinations of those elements that perform substantially the same function in substantially the same way to achieve the same results are within the scope of the invention. Substitutions of elements from one described embodiment to another are also fully intended and contemplated.

What is claimed is:

1. A system for determining a location of a device emitting a wireless transmission among a plurality of devices, said system comprising:
   a transmitter transmitting a synchronization signal to the plurality of devices;
   at least one receiver system receiving said wireless transmission from said device within a time slot window a predetermined time after said synchronization signal, said predetermined time being assigned to said device, wherein said wireless transmission from said device includes a preamble code of a known length, said preamble code including a code identifying said device, and at least one additional pulse received in a time window a predetermined time after an end of said preamble code; and
   a processor:
   receiving said at least one additional pulse;
   determining a time of receipt of said at least one additional pulse,
   determining whether said received at least one additional pulse has an amplitude in a range of values determined based on an amplitude of pulses within the preamble code; and
   determining the location of the device emitting the wireless transmission based on a location of selected ones of the at least one receiver system receiving said wireless transmission and the determined time of receipt of said at least one additional pulse having an amplitude in said range of values.

2. The system of claim 1, wherein said at least one additional pulse is composed of a plurality of pulses.

3. The system of claim 1, wherein said preamble code comprises a plurality of pulses.

4. The system of claim 1, wherein said processor includes:
   a zero-crossing circuit providing an indication of a zero voltage crossing of said at least one additional pulse;
   a trigger device latching said indication of said zero-voltage crossing; and
   a ripple counter receiving said latched indication of said zero-voltage crossing, wherein said latched indication of said zero-voltage crossing operates as a stop clock signal to associate a count of the ripple counter with a time of receipt of said latched indication.

5. The system of claim 1, wherein said at least one additional pulse includes at least one of: biometric data, medical data, alarm data, altitude data and attitude data.

6. The system of claim 1, wherein said preamble code is pre-loaded within said device.

7. The system of claim 1, wherein said preamble code is downloaded into said device.

8. The system of claim 1, wherein the location of each of the at least one receiving system may be determined based on one of: global positioning satellite coordinates, latitude/longitude coordinates, and preset coordinates.

9. The system of claim 1, wherein said synchronization signal is transmitted at a known time period.

10. The system of claim 9, wherein each of said-time slot windows is assigned within said known time period.

11. The system of claim 1 wherein said time slot window is determined by said preamble code.

* * * * *